(12) United States Patent
Sakai et al.

(10) Patent No.: US 10,205,838 B2
(45) Date of Patent: Feb. 12, 2019

(54) IMAGE FORMING APPARATUS INCLUDING UPPER CASING WHICH OPENS AND CLOSES RELATIVE TO LOWER CASING

(71) Applicant: Brother Kogyo Kabushiki Kaisha, Nagoya-shi, Aichi-ken (JP)

(72) Inventors: Ryosuke Sakai, Nagoya (JP); Takamasa Tsukada, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/408,499

(22) Filed: Jan. 18, 2017

(65) Prior Publication Data

US 2017/0214811 A1   Jul. 27, 2017

(30) Foreign Application Priority Data

Jan. 22, 2016 (JP) .................. 2016-010999
Jan. 22, 2016 (JP) .................. 2016-011000

(51) Int. Cl.
 *H04N 1/00* (2006.01)
 *G03G 21/16* (2006.01)
(52) U.S. Cl.
 CPC ..... *H04N 1/00551* (2013.01); *G03G 21/1628* (2013.01); *H04N 1/00557* (2013.01); *H04N 1/00559* (2013.01); *H04N 2201/0082* (2013.01)
(58) Field of Classification Search
 CPC .............................................. G03G 21/1628
 See application file for complete search history.

(56) References Cited

U.S. PATENT DOCUMENTS

| 7,822,362 B2 | 10/2010 | Watanabe et al. |
| 7,826,769 B2 | 11/2010 | Yamaguchi |
| 8,922,840 B2 | 12/2014 | Ito |
| 9,268,294 B2 | 2/2016 | Namba |
| 2007/0196128 A1 | 8/2007 | Ishihara et al. |

(Continued)

FOREIGN PATENT DOCUMENTS

| JP | 2007-251934 A | 9/2007 |
| JP | 2007-279274 A | 10/2007 |

(Continued)

OTHER PUBLICATIONS

JP_2007279274_A_T Mashine translation, Japan, 2007, Minagawa.*

*Primary Examiner* — Victor Verbitsky
(74) *Attorney, Agent, or Firm* — Banner & Witcoff, Ltd.

(57) ABSTRACT

An image forming apparatus includes a lower casing, an upper casing, an arm, and a brake member. The lower casing includes a photosensitive body. The upper casing includes an exposure unit configured to expose the photosensitive body. The upper casing is configured to pivot on a predetermined axis relative to the lower casing between a closed position where the upper casing covers an upper portion of the lower casing and an open position where the upper casing exposes the upper portion of the lower casing. The slider is attached to the upper casing and is configured to slide in a sliding direction orthogonal to the predetermined axis. The arm includes a first end pivotably connected to the lower casing and a second end pivotably connected to the slider. The brake member is configured to control a speed of the slider when the slider slides in the sliding direction.

22 Claims, 11 Drawing Sheets

(56) References Cited

U.S. PATENT DOCUMENTS

| | | | |
|---|---|---|---|
| 2009/0022516 A1* | 1/2009 | Ohta | G03G 21/1628 |
| | | | 399/126 |
| 2009/0087209 A1* | 4/2009 | Yamaguchi | G03G 15/011 |
| | | | 399/98 |
| 2009/0214258 A1 | 8/2009 | Yamaguchi | |
| 2009/0252527 A1 | 10/2009 | Watanabe et al. | |
| 2013/0287433 A1* | 10/2013 | Ito | G03G 21/1619 |
| | | | 399/107 |
| 2014/0029063 A1 | 1/2014 | Ito | |
| 2015/0160601 A1 | 6/2015 | Namba | |

FOREIGN PATENT DOCUMENTS

| | | |
|---|---|---|
| JP | 2009-204709 A | 9/2009 |
| JP | 2009-251230 A | 10/2009 |
| JP | 2014-025970 A | 2/2014 |
| JP | 2015-115617 A | 6/2015 |

\* cited by examiner

IMAGE FORMING APPARATUS INCLUDING UPPER CASING WHICH OPENS AND CLOSES RELATIVE TO LOWER CASING

CROSS-REFERENCE TO RELATED APPLICATION

This application claims priority from Japanese Patent Applications No. 2016-010999, which was filed on Jan. 22, 2016, and No. 2016-011000, which was filed on Jan. 22, 2016, the contents of which are incorporated herein by reference in their entirety.

FIELD OF DISCLOSURE

Aspects disclosed herein relates to an image forming apparatus including an upper casing capable of opening and closing relative to a lower casing.

BACKGROUND

Known image forming apparatuses include a lower casing, and an upper casing serving as a top cover. The lower casing includes a photosensitive drum. The top cover has a first end which is supported such that the top cover is pivotable on a predetermined axis relative to the lower casing. The top cover is capable of opening and closing relative to the lower casing.

In some of the known image forming apparatuses, a photosensitive drum and a cartridge containing toner are attached to the lower casing, and an LED array that is an exposure unit for exposing the photosensitive drum is disposed at its top cover.

SUMMARY

In the known image forming apparatus in which the top cover includes the LED array, the top cover may have a relatively heavy weight. Due to this configuration, when the top cover is being closed, a closing speed of the top cover may tend to be relatively fast.

The image forming apparatus may further include a brake member configured to control the opening and closing speed of the top cover to reduce the closing speed of the top cover. Furthermore, when the brake member is provided at only one side of the image forming apparatus in the right-left direction, a twisting force may act on the top cover.

According to the one or more aspects of the disclosure, an image forming apparatus may include a lower casing, an upper casing, an arm, and a brake member. The lower casing may include a photosensitive body. The upper casing may include an exposure unit configured to expose the photosensitive body. The upper casing may be configured to pivot on a predetermined axis relative to the lower casing between a closed position where the upper casing covers an upper portion of the lower casing and an open position where the upper casing exposes the upper portion of the lower casing. The slider may be attached to the upper casing and may be configured to slide in a sliding direction orthogonal to the predetermined axis. The arm may include a first end pivotably connected to the lower casing and a second end pivotably connected to the slider. The brake member may be configured to control a speed of the slider when the slider slides in the sliding direction.

According to the one or more other aspects of the disclosure, an image forming apparatus may include a lower casing, an upper casing, a first arm, a second arm, a brake member, and a braking-force transmitting member. The lower casing may include a photosensitive body. The upper casing may include an exposure unit configured to expose the photosensitive body. The upper casing may be configured to pivot on a predetermined axis relative to the lower casing between a closed position where the upper casing covers an upper portion of the lower casing and an open position where the upper casing exposes the upper portion of the lower casing. The first slider may be attached to a first end portion of the upper casing in a direction in which the predetermined axis extends and may be configured to slide in a sliding direction orthogonal to the predetermined axis. The first arm may be disposed at a first end portion of the image forming apparatus in the direction in which the predetermined axis extends. The first arm may include a first end pivotably connected to the lower casing and a second end pivotably connected to the first slider. The second slider may be attached to a second end portion of the upper casing in the direction in which the predetermined axis extends and may be configured to slide in the sliding direction. The second arm may be disposed at a second end portion of the image forming apparatus in the direction in which the predetermined axis extends. The second arm may include a first end pivotably connected to the lower casing and a second end pivotably connected to the second slider. The brake member may be disposed at the first end portion of the upper casing in the direction in which the predetermined axis extends and may be configured to control a speed of the first slider when the first slider slides in the sliding direction. The braking-force transmitting member may be configured to transmit a braking force generated by the brake member to the second slider to control a speed of the second slider sliding in the sliding direction.

BRIEF DESCRIPTION OF THE DRAWINGS

Aspects of the disclosure are illustrated by way of example and not by limitation in the accompanying figures in which like reference characters indicate similar elements.

DETAILED DESCRIPTION

Hereinafter, an illustrative embodiment will be described with reference to the accompanying drawings.

[Overall Configuration of Image Forming Apparatus]

Figure 1:
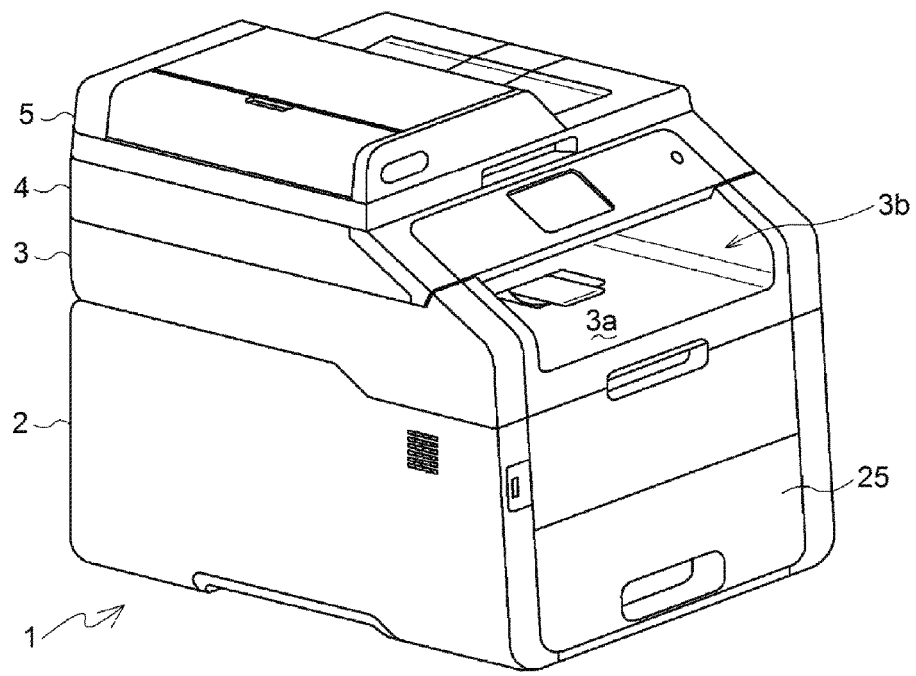
FIG. 1 is a perspective view illustrating an image forming apparatus in an illustrative embodiment according to one or more aspects of the disclosure, wherein a joint cover is closed completely.
Figure 2:
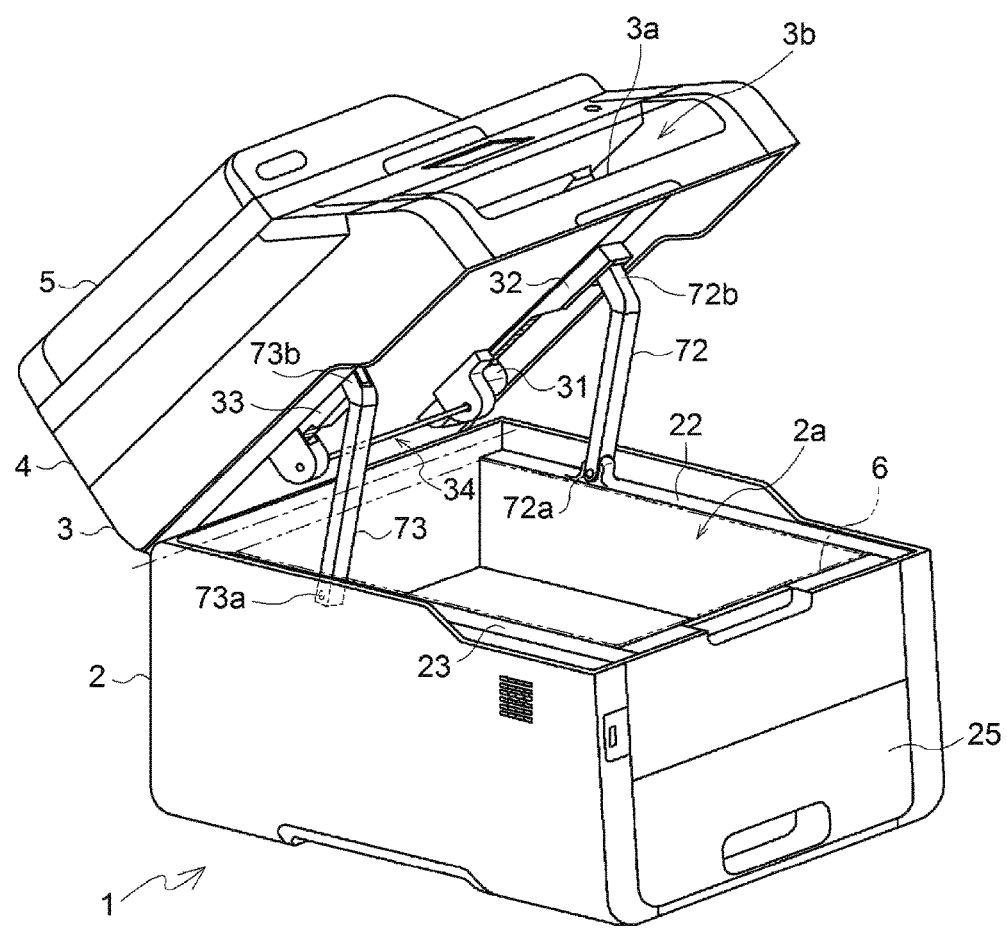
FIG. 2 is a perspective view illustrating the image forming apparatus in the illustrative embodiment according to one or more aspects of the disclosure, wherein the joint cover is opened completely.

As illustrated in FIGS. 1 and 2, the image forming apparatus 1 includes a lower casing 2, a joint cover 3, a scanner 4, and an automatic sheet feeder 5. The joint cover 3 is located above the lower casing 2. The scanner 4 is located above the joint cover 3. The automatic sheet feeder 5 is located above the scanner 4. The joint cover 3 is an example of an upper casing that is supported so as to be capable of opening and closing with respect to the lower casing 2. The lower casing 2 and the joint cover 3 constitute a casing of the image forming apparatus 1. The casing of the image forming apparatus 1 accommodates an image forming unit for forming an image on a sheet P. The image forming unit may be an electrophotographic-type image forming unit. The image forming unit includes a photosensitive unit 6 and an exposure unit.

In the description below, as depicted in FIG. 1, an up-down direction is defined with reference to an orientation of an image forming apparatus 1 that is disposed in an orientation in which it may be intended to be used. A direction in which an axis O1 extends (hereinafter, referred to as the axis O1 direction) is defined as a right-left direction of the image forming apparatus 1, and a direction that extends horizontally and orthogonal to the axis O1 direction is defined as a front-rear direction. A side of the image forming apparatus 1, in which an opening 3b of a discharge tray 3a is provided, is defined as the front of the image forming apparatus 1 with respect to the front-rear direction.

The lower casing 2 has a substantially rectangular parallelepiped shape and has an opening 2a at an upper end. The lower casing 2 supports the joint cover 3 such that the joint cover 3 is pivotable on the axis O1. The axis O1 is an example of a predetermined axis. The lower casing 2 includes side frames 22 and 23. The side frames 22 and 23 define opposite surfaces, respectively, extending in a direction orthogonal to the axis O1.

The axis O1 is located at a rear end portion of the lower casing 2. The side frames 22 and 23 are located at right and left end portions, respectively, of the lower casing 2. The photosensitive unit 6 is disposed between the side frames 22 and 23 in the lower casing 2. A feed cassette 25 is disposed below the photosensitive unit 6 in the lower casing 2.

The joint cover 3 has a rear end that may be one of end portions thereof. The rear end of the joint cover 3 is supported such that the joint cover 3 is pivotable on the axis O1 relative to the lower casing 2 between a closed position and an open position. At the closed position, the joint cover 3 covers the opening 2a provided at the upper end of the lower casing 2. At the open position, the joint cover 3 uncovers the opening 2a.

The joint cover 3 includes sliders 32 and 33 at its right and left end portions. The sliders 32 and 33 are slidable along the front-rear direction orthogonal to the axis O1. The slider 32 is an example of a first slider disposed at a first end portion of the joint cover 3 in the axis O1 direction. The slider 33 is an example of a second slider disposed at a second end portion of the joint cover 3 in the axis O1 direction. The slider 33 is also an example of a further slider.

The image forming apparatus 1 further includes arms 72 and 73 between the lower casing 2 and the joint cover 3. The arms 72 and 73 are disposed at right and left end portions of the image forming apparatus 1. The arm 72 is an example of a first arm disposed at a first end portion of the image forming apparatus 1 in the axis O1 direction. The arm 73 is an example of a second arm disposed at a second end portion of the image forming apparatus 1 in the axis O1 direction. The arm 73 is also an example of a further arm.

The arm 72 has a first end 72a and a second end 72b, and the arm 73 has a first end 73a and a second end 73b. The first end 72a of the arm 72 is supported by an upper end of the side frame 22 of the lower casing 2 such that the arm 72 is pivotable relative to the side frame 22. The second end 72b of the arm 72 is supported by the slider 32 of the joint cover 3 such that the arm 72 is pivotable relative to the slider 32. The first end 73a of the arm 73 is supported by an upper end of the side frame 23 of the lower casing 2 such that the arm 73 is pivotable relative to the side frame 23. The second end 73b of the arm 73 is supported by the slider 33 of the joint cover 3 such that the arm 73 is pivotable relative to the slider 33.

The joint cover 3 including the slider 32 further includes a brake member 31 at one of opposite end portions thereof in the right-left direction. The brake member 31 is configured to control sliding movement of the slider 32 in the front-rear direction. The brake member 31 is an example of a brake member disposed at the first end portion of the joint cover 3 in the axis O1 direction.

The joint cover 3 further includes a braking-force transmitting member 34 configured to transmit a braking force generated by the brake member 31 (disposed at the first end portion of the joint cover 3 in the right-left direction) to the slider 33 (disposed at the second end portion of the joint cover 3 in the right-left direction).

Figure 3A:
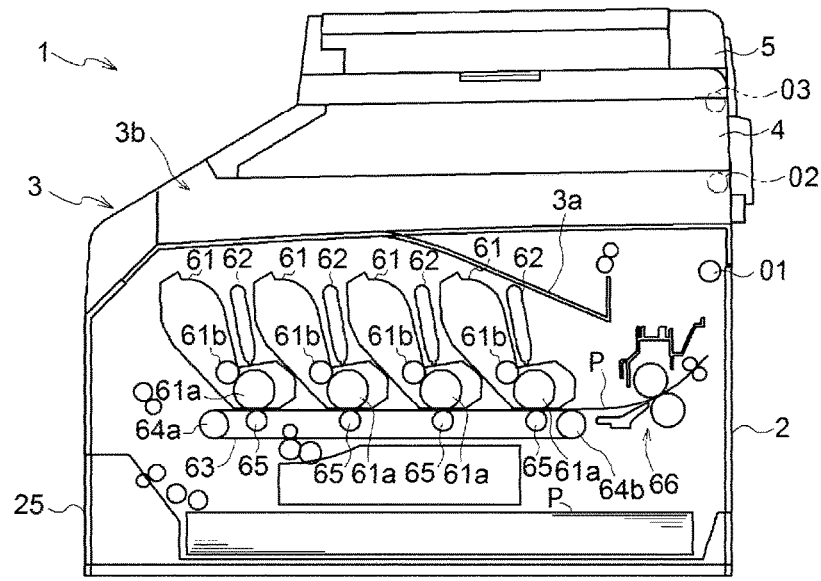
FIG. 3A is a central cross sectional view illustrating the image forming apparatus in the illustrative embodiment according to one or more aspects of the disclosure, wherein the joint cover is closed completely.
Figure 3B:
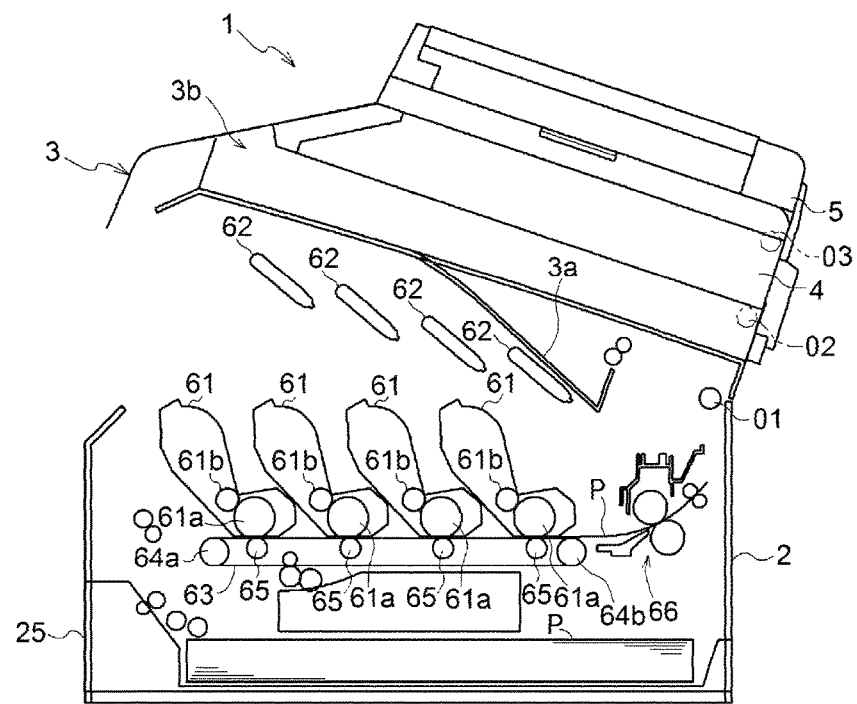
FIG. 3B is a central cross sectional view illustrating the image forming apparatus in the illustrative embodiment according to one or more aspects of the disclosure, wherein the joint cover is opened completely.

As illustrated in FIGS. 3A and 3B, the photosensitive unit 6 includes a plurality of, for example, four drum units 61 in tandem with each other in the front-rear direction. The drum units 61 are provided corresponding to respective colors of black (B), yellow (Y), magenta (M), and cyan (Y) and are disposed in this order along a conveyance direction in which a conveyor belt 63 conveys a sheet P (hereinafter, referred to as the sheet P conveyance direction).

In a state where the joint cover 3 is located at the open position to expose the opening 2a, each of the drum units 61 is attachable to and detachable from the lower casing 2 through the opening 2.

Each of the drum units 61 includes a photosensitive drum 61a and a developing roller 61b. A circumferential surface of the photosensitive drum 61a is uniformly charged by a charger (not illustrated) in conjunction with rotation of the photosensitive drum 61a. The photosensitive drum 61a is an example of a photosensitive body.

The joint cover 3 further includes LED arrays 62 constituting the exposure unit. Each of the LED arrays 62 includes a plurality of LED elements arrayed along the axis O1 direction.

In FIG. 2, the LED arrays 62 are omitted from the joint cover 3.

The LED arrays 62 each have a first end (e.g., an upper end in FIG. 3A) and a second end (e.g., a lower end in FIG. 3A) that are opposite to each other in a direction orthogonal to the array direction of the LED elements. In each of the LED arrays 62, the first end is supported so as to be pivotable relative to the joint cover 3, and the second end is movable between an exposing position and a retracted position. At the exposing position, the second end is located distant from the joint cover 3. At the retracted position, the second end is located near the joint cover 3. The LED arrays 62 are provided corresponding to the number of drum units 61, i.e., four LED arrays 62 are provided. The LED arrays 62 are disposed in tandem with each other in the front-rear direction.

In a state where the joint cover 3 is located at the closed position relative to the lower casing 2, the LED arrays 63 are located at the respective exposing positions and the second end of each of the LED arrays 62 faces a circumferential surface of a corresponding one of the photosensitive drums 61a (refer to FIG. 3A). In a state where the joint cover 3 is located at the open position relative to the lower casing 2, the LED arrays 63 are located at the respective retracted positions and the second end of each of the LED arrays 63 is located out of the lower casing 2 (refer to FIG. 3B).

After uniformly charged by the charger, selective portions of the circumferential surfaces of the photosensitive drums 61a are exposed by the respective corresponding LED arrays 62. Through this exposure, electrical charge is removed selectively from the circumferential surfaces of the photosensitive drums 61a to form electrostatic latent images thereon, respectively.

The developing rollers 61b are applied with a developing bias. When the electrostatic latent images formed on the respective photosensitive drums 61a face the corresponding developing rollers 61b, toner adheres to the electrostatic latent images from the developing rollers 61b due to potential difference between the electrostatic latent images and the developing rollers 61b. Thus, toner images are formed on the circumferential surfaces of the photosensitive drums 61a.

The feed cassette 25 is disposed at a bottom in the lower casing 2. The feed cassette 25 accommodates therein one or more sheets P. The one or more sheets P accommodated in the feed cassette 25 is fed, one by one, onto the conveyor belt 63 by rollers. The conveyor belt 63 is looped around a drive roller 64a and a driven roller 64b. The conveyor belt 63 is disposed below the photosensitive drums 61a and faces thereto. Transfer rollers 65 are disposed across the conveyor belt 63 from the respective corresponding photosensitive drums 61a.

By rotation of the conveyor belt 63 driven by the drive roller 64a, a sheet P placed on the conveyor belt 63 passes under the photosensitive drums 61a successively. When the toner images formed on the circumferential surfaces of the photosensitive drums 61a face the sheet P being conveyed, the toner images are transferred onto the sheet P by application of a transfer bias to the transfer rollers 65.

The image forming apparatus 1 further includes a fixing unit 66. The fixing unit 66 is disposed downstream of the conveyor belt 63 in the sheet P conveyance direction. The sheet P on which the toner images have been transferred is then conveyed to the fixing unit 66. The fixing unit 66 applies heat and pressure to the sheet P to fix the toner images onto the sheet P. The sheet P on which the toner images have been fixed is then discharged onto the discharge tray 3a of the joint cover 3.

The joint cover 3 is configured to pivot between the closed position and the open position on the axis O1. In a state where the joint cover 3 is located at the open position to expose the opening 2a of the lower casing 2, maintenance, e.g., replacement of one or more drum units 61 with new ones or clearance of a paper jam in the lower casing 2, may be performed through the opening 2a.

The scanner 4 is supported so as to be pivotable on an axis O2 relative to the joint cover 3. The axis O2 is located at rear end portions of the joint cover 3 and the scanner 4. The axis O2 extends parallel to the axis O1. The scanner 4 is configured to pivot between a closed position and an open position. At the closed position, a front end of the scanner 4 is located close to the joint cover 3 and the scanner 4 covers an upper surface of the joint cover 3. At the open position, the front end of the scanner 4 is located distant from the joint cover 3 than the front end of the scanner 4 at the closed position.

The automatic sheet feeder 5 is supported so as to be pivotable on an axis O3 relative to the scanner 4. The axis O3 is located at the rear end portions of the scanner 4 and the automatic sheet feeder 5. The axis O3 extends parallel to the axis O1. The automatic sheet feeder 5 is configured to pivot between a closed position and an open position. At the closed position, a front end of the automatic sheet feeder 5 is located close to the scanner 4 and the automatic sheet feeder 5 covers an upper surface of the scanner 4. At the open position, the front end of the automatic sheet feeder 5 is located distant from the scanner 4 than the front end of the automatic sheet feeder 5 at the closed position.

[Opening and Closing Mechanism for Joint Cover]

In the image forming apparatus 1, the brake member 31 controls the sliding movement of the slider 32 supporting the second end 72b of the arm 72 positioned between the lower casing 2 and the joint cover 3. More specifically, the brake member 31 controls the sliding movement of the slider 32 (e.g., reduces the sliding speed of the slider 32) when the joint cover 3 pivots in a direction to close. This control may prevent or reduce a sudden closing of the joint cover 3 relative to the lower casing 2, thereby preventing or reducing damage to the LED arrays 62 attached to the joint cover 3.

Figure 4:
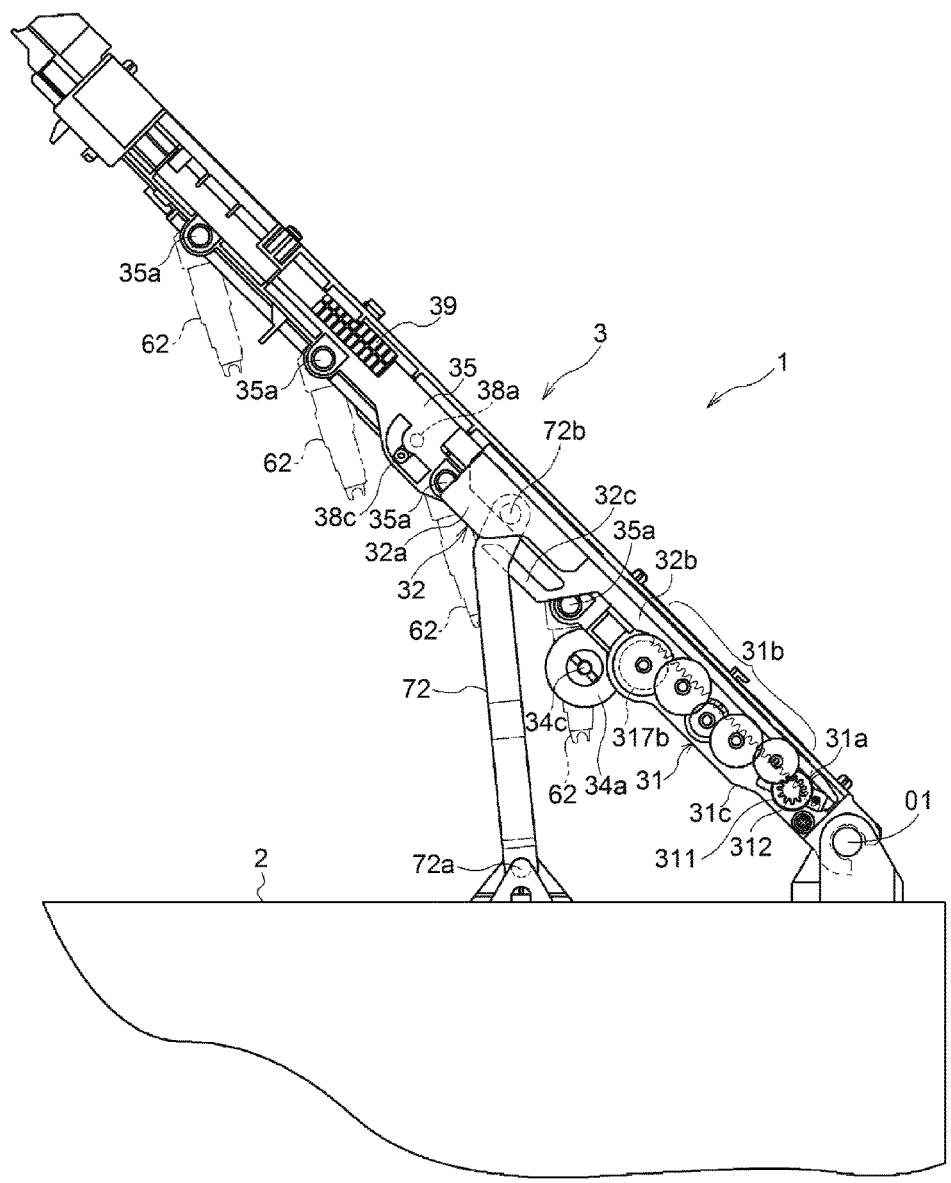
FIG. 4 is a side view illustrating an opening and closing mechanism for the joint cover in the illustrative embodiment according to one or more aspects of the disclosure, wherein the joint cover is opened completely.
Figure 5:
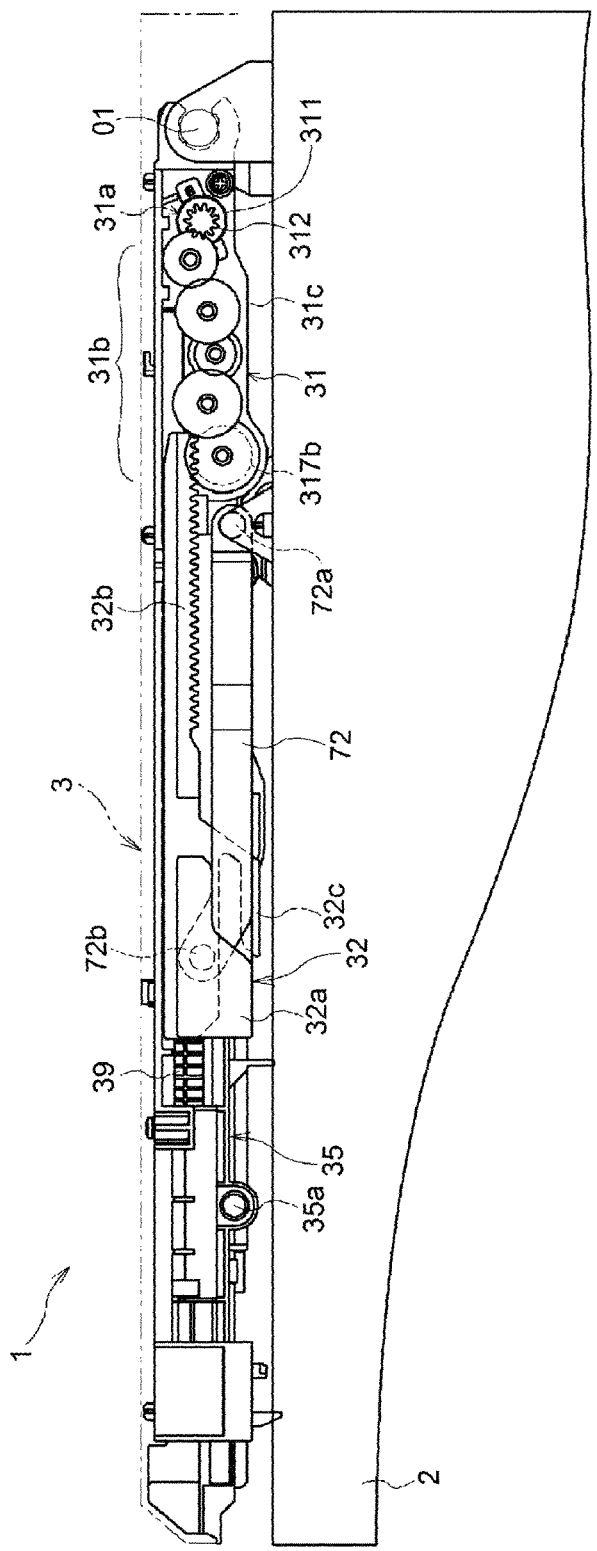
FIG. 5 is a side view illustrating the opening and closing mechanism for the joint cover in the illustrative embodiment according to one or more aspects of the disclosure, wherein the joint cover is closed completely.
Figure 6:
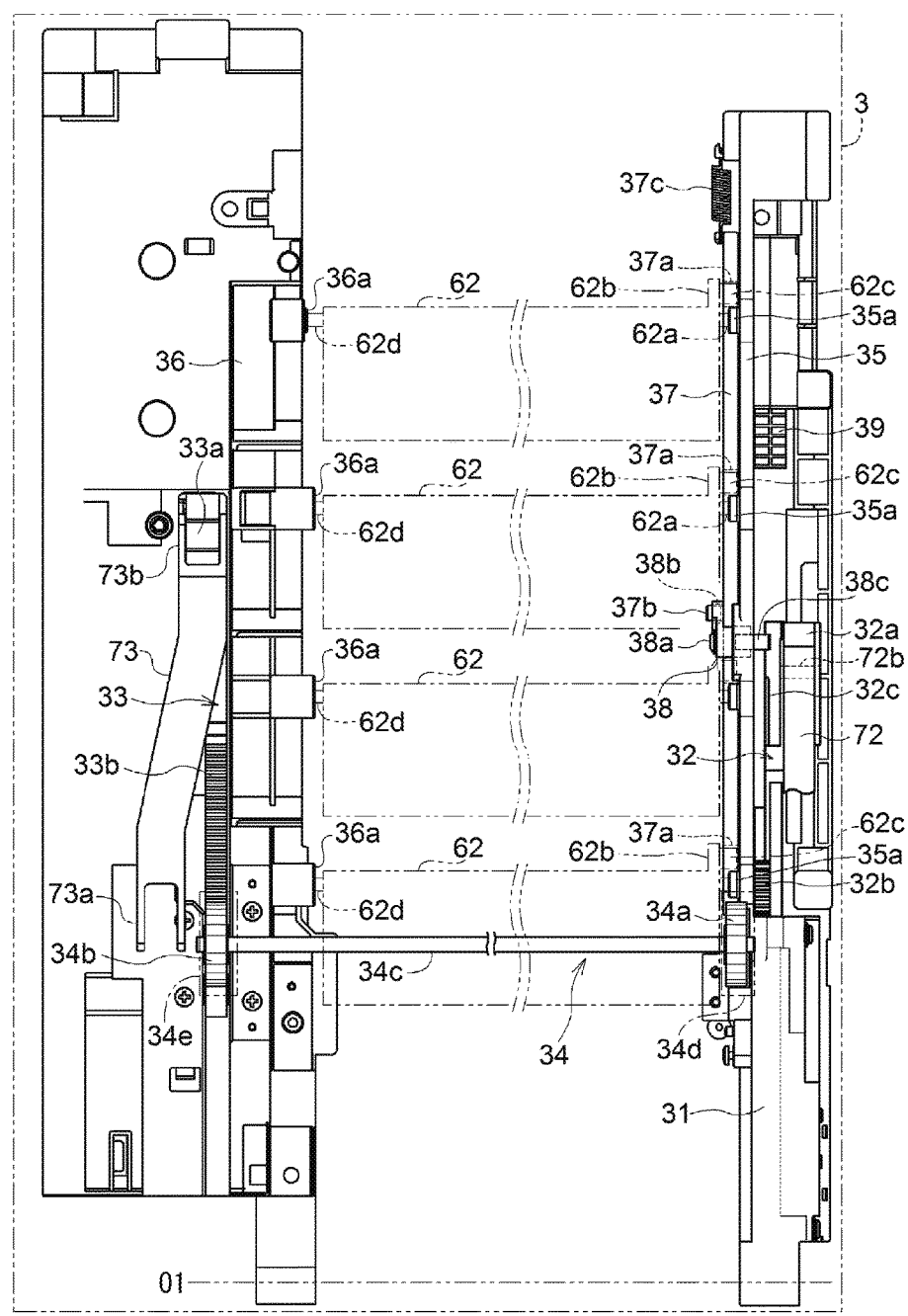
FIG. 6 is a bottom view illustrating the opening and closing mechanism for the joint cover in the illustrative embodiment according to one or more aspects of the disclosure.

As illustrated in FIGS. 4, 5, and 6, the slider 32 includes a support 32a and a rack gear 32b. The support 32a supports the second arm 72b of the arm 72. The rack gear 32b extends toward the rear from the support 32a in a direction in which the slider 32 slides (hereinafter referred to as the sliding direction). The rack gear 32b is an example of a rack, and is also an example of a first rack.

When the joint cover 3 pivots from the open position toward the closed position, the slider 32 slides frontward in conjunction with pivoting of the arm 72 relative to the lower casing 2 in a direction that a tilting angle of the arm 72 with respect to the lower casing 2 becomes smaller. When the joint cover 3 pivots from the closed position toward the open position, the slider 32 slides rearward in conjunction with pivoting of the arm 72 relative to the lower casing 2 in a direction that the tilting angle of the arm 72 becomes larger.

When the joint cover 3 is located at the open position where the joint cover 3 has the largest pivoting angle relative to the lower casing 2, the slider 32 is located at a rearmost position. When the joint cover 3 is located at the closed position where the joint cover 3 extends parallel to the lower casing 2, the slider 32 is located at a foremost position.

The brake member 31 is disposed at the rear end portion of one of the opposite end portions of the joint cover 3 in the right-left direction. The brake member 31 includes a rotary damper 31a, a gear unit 31b, and a housing 31c. The rotary damper 31a is configured to generate a braking force. The gear unit 31b is configured to transmit the braking force generated by the rotary damper 31a to the rack gear 32b. The housing 31c accommodates therein the rotary damper 31a and the gear unit 31b.

The rotary damper 31a includes a housing 311, a shaft (not illustrated), a rotor (not illustrated), and a brake gear 312. The shaft is disposed inside the housing 311 so as to be rotatable and extends to the outside of the housing 311. The rotor is disposed inside the housing 311 and is attached to the shaft in the housing 311. The rotor is configured to rotate together with the shaft. The brake gear 312 is disposed outside the housing 311 and is attached to the shaft. The brake gear 312 is configured to rotate together with the shaft. The brake gear 312 is an example of a damper gear.

The housing 311 is filled with viscous fluid. The viscous fluid may be, for example, silicon oil with various fixed particles and/or magnetic particles being dispersed therein, or silicon oil with inorganic additive being added.

In the rotary damper 31a, when the rotor rotates by rotation of the shaft, friction is generated between the rotor and the viscus fluid in the housing 311. Thus, the brake gear 312 attached to the shaft receives the braking force that tends to stop the rotation of the rotor.

The degree of the braking force received by the brake gear 312 is proportional to the rotating speed of the rotor. For example, higher rotating speed of the rotor, the braking force received by the brake gear 312 increases. The brake gear 312 and the rotor are both configured to rotate together with the same shaft. This configuration enables the brake member 31 to generate a braking force proportional to the rotating speed of the brake gear 312. Therefore, in a case where the pivoting speed of the joint cover 3 increases during closing of the joint cover 3, the brake member 31 is able to generate a braking force in accordance with the closing speed of the joint cover 3.

In the rotary damper 31a, the housing 311, the shaft, the rotor, and the viscus fluid constitute a damper portion.

Figure 7A:
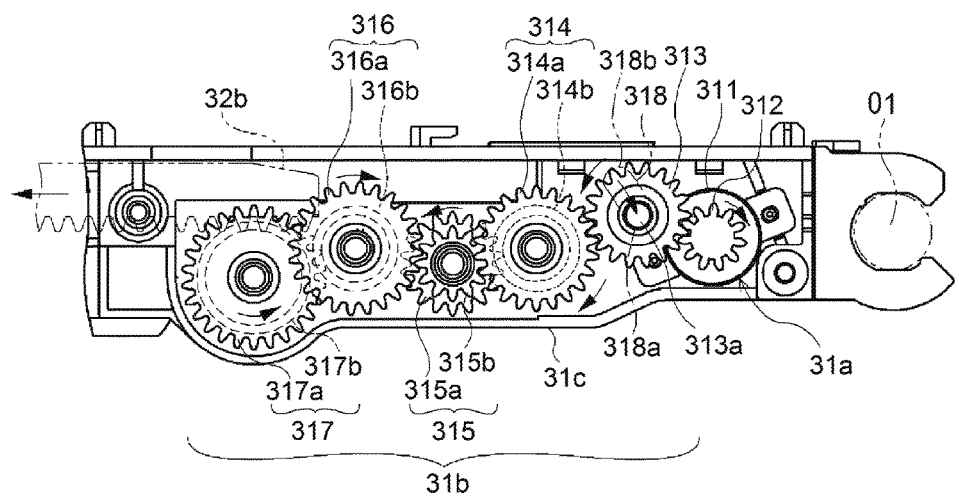
FIG. 7A is a side view illustrating an internal configuration of a brake member in which a swing gear as a braking-force transmission switching member is in mesh with a brake gear in the illustrative embodiment according to one or more aspects of the disclosure.
Figure 7B:
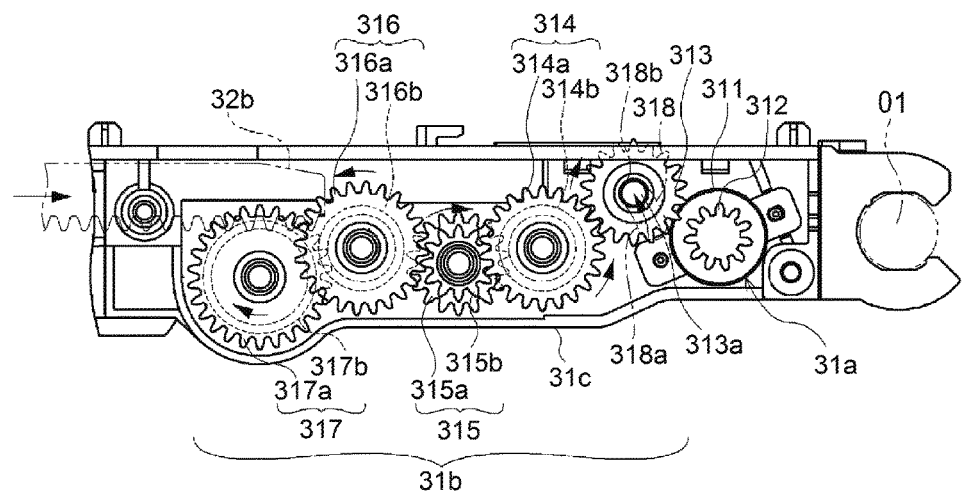
FIG. 7B is a side view illustrating the internal configuration of the brake member in which the swing gear is not in mesh with the brake gear in the illustrative embodiment according to one or more aspects of the disclosure.
Figure 8A:
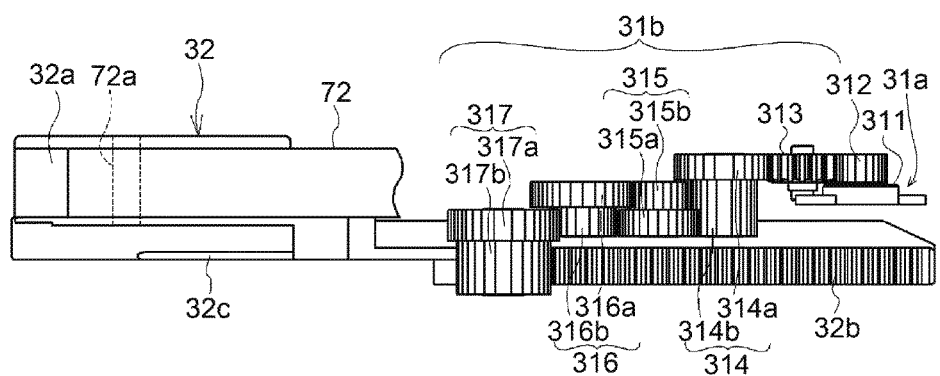
FIG. 8A is a top view illustrating the internal configuration of the brake member including the swing gear as the braking-force transmission switching member in the illustrative embodiment according to one or more aspects of the disclosure.

As illustrated in FIGS. 7 and 8A, the gear unit 31b includes gears 313, 314a, 314b, 315a, 315b, 316a, 316b, 317a, and 317b. The gear 313 is capable of meshing with the brake gear 312. The gear 314a is in mesh with the gear 313. The gear 314b is coaxial with the gear 314a and is rotatable together with the gear 314a. The gear 315a is in mesh with the gear 314b. The gear 315b is coaxial with the gear 315a and is rotatable together with the gear 315a. The gear 316a is in mesh with the gear 315b. The gear 316b is coaxial with the gear 316a and is rotatable together with the gear 316a. The gear 317a is in mesh with the gear 316b. The gear 317b is coaxial with the gear 317a and is rotatable together with the gear 317a.

The gears 314a and 314b constitute a gear component 314. The gears 315a and 315b constitute a gear component 315. The gears 316a and 316b constitute a gear component 316. The gears 317a and 317b constitute a gear component 317. In the gear unit 31b, the gear 313, the gear component 314, the gear component 315, the gear component 316, and the gear component 317 are disposed in this order from the rear toward the front.

The housing 31c of the brake member 31 has an opening in its front end. The opening allows an entry of the rack gear 32b into the housing 31c therethrough.

The rack gear 32b is in mesh with the gear 317b of the gear unit 31b in the housing 31c.

As described above, the brake gear 312 of the rotary damper 31a and the gear 313 of the gear unit 31b are in mesh with each other, and the gear 317b of the gear unit 31b and the rack gear 32b are in mesh with each other. This configuration enables transmission of a braking force generated by the rotary damper 31a to the rack gear 32b via the gear unit 31b.

The gear 313 includes a gear shaft 313a. The housing 31c of the brake member 31 has an elongated hole 318. The gear shaft 313a is engaged with the elongated hole 318. The elongated hole 318 has a first edge 318a and a second edge 318b. The gear shaft 313a of the gear 313 is configured to slide between the first edge 318a and the second edge 318b within the elongated hole 318. When the gear shaft 313a of the gear 313 is in contact with the first edge 318a of the elongated hole 318, the gear 313 is in mesh with the adjacent brake gear 312. When the gear shaft 313a of the gear 313 is in contact with the second edge 318b of the elongated hole 318, the gear 313 is spaced from the brake gear 312 and is not in mesh with the brake gear 312.

The gears of the gear unit 31b rotate in accordance with sliding of the rack gear 32b along the front-rear direction. When the rack gear 32b slides frontward, the gear shaft 313a of the gear 313 moves to the first edge 318a of the elongated hole 318 by rotation of the gears of the gear unit 31b and thus the gear 313 meshes with the brake gear 312 (refer to FIG. 7A). When the rack gear 32b slides rearward, the gear shaft 313a of the gear 313 moves to the second edge 318a of the elongated hole 318 by rotation of the gears of the gear unit 31b and thus the gear 313 disengages from the brake gear 312 (refer to FIG. 7B).

With this configuration, when the joint cover 3 pivots in the closing direction from the open position toward the closed position, the slider 32 slides frontward. In response to this, the rack gear 32b slides frontward and thus the gear 313 meshes with the brake gear 312 to transmit a braking force generated by the rotary damper 31a to the rack gear 32b. The transmission of the braking force enables reduction of the speed of the slider 32 sliding frontward, resulting in reduction of the speed of the joint cover 3 pivoting from the open position toward the closed position. This may thus reduce or prevent damage to the LED arrays 62 that may be caused by a sudden closing of the joint cover 3.

When the joint cover 3 pivots in the opening direction from the closed position toward the open position, the slider 32 slides rearward. In response to this, the rack gear 32b slides rearward and thus the gear 313 disengages from the brake gear 312 to interrupt transmission of a braking force generated by the rotary damper 31a to the rack gear 32b. With the interruption of transmission of the braking force, the speed of the slider 32 sliding rearward is not controlled (e.g., is not reduced) by the brake member 31.

As described above, in the illustrative embodiment, the image forming apparatus 1 is configured such that, only when the joint cover 3 pivots in the closing direction, a braking force generated by the brake member 31 is transmitted to the rack gear 32b. Therefore, this configuration may enable reduction of the pivoting speed of the joint cover 3 when the joint cover 3 is being closed, whereas this may also reduce resistance to pivoting of the joint cover 3 when the joint cover 3 is being opened. [0067]

The gear 313 is an example of a swing gear that is included in the gear train of the gear unit 31b and whose gear shaft 313a is slidable within the elongated hole 318. The gear 313 may be a braking-force transmission switching member that is configured to change a state of transmission of a braking force from the rotary damper 31a to the rack gear 32b. More specifically, the braking-force transmission switching member is configured to, when the joint cover 3 pivots in the closing direction, transmit a braking force to the rack gear 32b.

In the illustrative embodiment, the gear 313 may be a swing gear and is used as the braking-force transmission switching member. Nevertheless, in other embodiments, for example, a one-way clutch may be included in the gear train of the gear unit 31b and may be used as the braking-force transmission switching member.

Figure 8B:
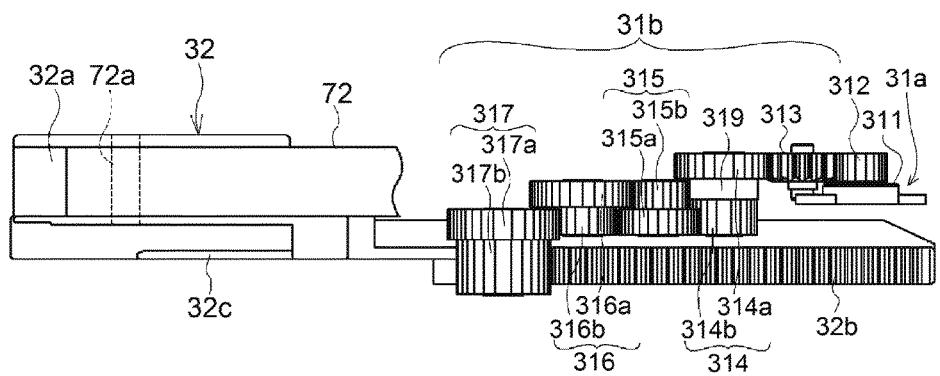
FIG. 8B is a top view illustrating the internal configuration of the brake member including a one-way clutch as the braking-force transmission switching member in the illustrative embodiment according to one or more aspects of the disclosure.

More specifically, as illustrated in FIG. 8B, a one-way clutch 319 is disposed between the gear 314a and the gear 314b, as the braking-force transmission switching member. In this case, the one-way clutch 319 is configured to, when the joint cover 3 pivots in the closing direction, establish transmission of a braking force from the rotary damper 31a to the rack gear 32b, and is configured to, when the joint cover 3 pivots in the opening direction, interrupt transmission of a braking force from the rotary damper 31a to the rack gear 32b.

In the illustrative embodiment, the brake member 31 using the rotary damper 31a is used to control (e.g., reduce) the sliding speed of the slider 32. Nevertheless, in other embodiments, for example, another brake member using a torque limiter may be used.

However, the brake member using the torque limiter does not generate a braking force proportionally to the pivoting speed of the joint cover 3. Therefore, it may be preferable that the brake member 31 using the rotary damper 31a is used for effectively reducing the pivoting speed of the joint cover 3 when the joint cover 3 is being closed.

[Spring for Urging Slider]

As depicted in FIGS. 4, 5, and 6, the joint cover 3 further includes a spring 39 in front of the slider 32. The spring 39 may be a compression spring. The spring 39 is configured to, when the joint cover 3 is at or near the closed position, apply, to the slider 32, an urging force that acts in a direction opposite to the direction in which the slider 32 slides when the joint cover 3 pivots in the closing direction, i.e., apply a rearward urging force to the slider 32.

That is, as illustrated in FIG. 4, when the joint cover 3 is located at the open position and the slider 32 is located at the rearmost position, the slider 32 is spaced from the spring 39.

From this state, as the joint cover 3 pivots in the closing direction, the slider 32 slides frontward. When the joint cover 3 reaches the vicinity of the closed position, the slider 32 contacts the spring 39.

As the joint cover 3 further pivots in the closing direction, the slider 32 also further slides frontward to press the spring 39, and thus, the spring 39 contracts. In a state where the spring 39 contracts, the spring 39 generates and applies a rearward urging force to the slider 32. Thus, the speed of the slider 32 sliding frontward is controlled (e.g., reduced).

In this case, the sliding speed of the slider 32 is also controlled (e.g., reduced) by the brake member 31. Therefore, the sliding speed of the slider 32 is controlled (e.g., reduced) by a combined braking force that may include the braking force generated by the brake unit 31 and the braking force generated by the spring 39. Consequently, this configuration may further reliably reduce the closing speed of the joint cover 3.

As illustrated in FIG. 5, when the joint cover 3 reaches the closed position by its further pivoting, the joint cover 3 stops pivoting. In a state where the joint cover 3 is located at the closed position, the slider 32 is applied with a rearward urging force from the spring 39.

Figure 9:
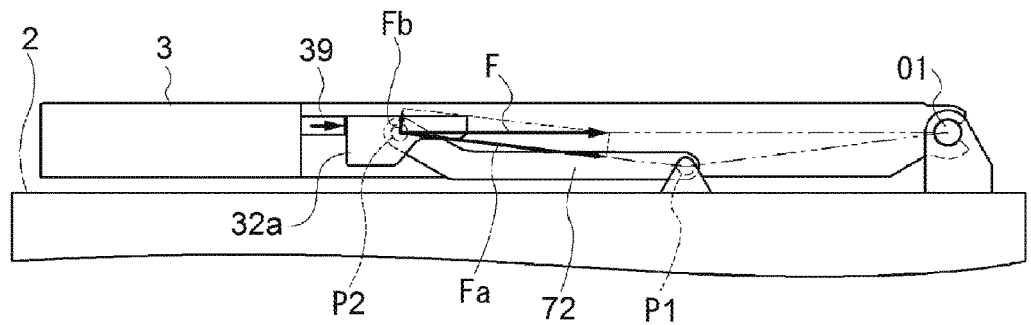
FIG. 9 is a side view of the joint cover and a portion of the lower casing in the illustrative embodiment according to one or more aspects of the disclosure, wherein a pressing force component directed upward is generated due to an urging force from a spring in a state where the joint cover is located at the closed position.

As illustrated in FIG. 9, a pivot P1 of the first end 72a of the arm 72 is located lower than the axis O1 that functions as the pivot of the joint cover 3 in the top-bottom direction. A pivot P2 of the second end 72b of the arm 72 is located higher than the pivot P1 in the top-bottom direction. In the illustrative embodiment, the pivot P2 and the axis O1 are located at substantially the same level in the top-bottom direction.

As described above, in a state where the joint cover 3 is located at the closed position and the pivot P1 is lower than the axis O1 and the pivot P2, the slider 32 is urged rearward by the spring 39. Thus, a pressing force F directed rearward acts on the slider 32. The pressing force F is resolved into a pressing force component Fa and a pressing force component Fb. The pressing force component Fa is directed toward the pivot P1 from the pivot P2 in a direction extending along a straight line connecting between the pivot P2 and the pivot P1. The pressing force component Fb is directed upward from the pivot P2 in a direction orthogonal to the straight line connecting between the pivot P2 and the pivot P1.

That is, in the state where the joint cover 3 is located at the closed position, the pressing force F directed rearward acts on the slider 32. In response to this, the pressing force component Fb directed upward is generated and thus a pressing force directed in the opening direction acts on the joint cover 3.

Therefore, this configuration may enable application of a braking force for controlling (e.g., reducing) the pivoting speed of the joint cover 3 in the closing direction also when the joint cover 3 is located at the closed position.

[LED Array Swinging Mechanism]

The image forming apparatus 1 further includes a link mechanism. The link mechanism is configured to swing each of the LED arrays 62 between the exposing position and a receded position in accordance with sliding of the slider 32 relative to the joint cover 3.

As illustrated in FIGS. 4, 5, 6, and 10, the joint cover 3 further includes a first guide frame 35 at the first end portion thereof in the axis O1 direction, and a second guide frame 36 at the second end portion thereof in the axis O1 direction. The first guide frame 35 extends along the sliding direction of the slider 32. The second guide frame 36 extends along the sliding direction of the slider 33. The guide frame 35 is located closer to the LED arrays 62 than the slider 32 in the axis O1 direction. The guide frame 36 is located closer to the LED arrays 62 than the slider 33 in the axis O1 direction.

In FIG. 5, the LED arrays 62 are omitted from the drawing.

The guide frame 35 has guide holes 35a for supporting the respective LED arrays 62 such that the LED arrays 62 are swingable. The guide frame 36 also has guide holes 36a for supporting the respective LED arrays 62 such that the LED arrays 62 are swingable. The number of guide holes 35a and the number of guide holes 36a are equal to the number of LED arrays 62 disposed at the joint cover 3.

Each of the LED arrays 62 includes a rotational shaft 62a at its first end in the axis O1 direction and a rotational shaft 62d at its second end in the axis O1 direction. The rotational shaft 62a may be engaged with a corresponding guide hole 35a. The rotational shaft 62d may be engaged with a corresponding guide hole 36a. Each of the LED arrays 62 is supported by the joint cover 3 swingably by engagement of the rotational shafts 62a and 62d with the guide holes 35a and 36, respectively.

Each of the LED arrays 62 further includes an arm 62b at its first end portion in the axis O1 direction. The arm 62b extends from the rotational shaft 62a in a direction orthogonal to the axis O1 direction. Each of the LED arrays 62 further includes a pin 62c that extends from a distal end portion of the arm 62b toward the first guide frame 35.

The joint cover 3 further includes an LED array operating plate 37 at the first end portion thereof in the axis O1 direction. The LED array operating plate 37 extends along the sliding direction of the slider 32. The LED array operating plate 37 is located closer to the LED arrays 62 than the first guide frame 35 in the axis O1 direction.

The LED array operating plate 37 has engagement holes 37a with which the pins 62c of the LED arrays 62 are engaged respectively. A tension spring 37c is hooked between a front end of the LED array operating plate 37 and the joint cover 3. The LED array operating plate 37 is urged frontward by the tension spring 37c.

The first guide frame 35 supports a link arm 38 at its substantially middle portion in the front-rear direction. The link arm 38 is supported so as to be pivotable on its rotational shaft 38a. The link arm 38 is located closer to the LED arrays 62 than the LED array operating plate 37 in the axis O1 direction. The link arm 38 has an engagement hole 38b in a distal end portion thereof. The LED array operating plate 37 has a pin 37b protruding therefrom toward the link arm 38. The pin 37b of the LED array operating plate 37 is engaged with the engagement hole 38b of the link arm 38.

The link arm 38 includes an operating pin 38c protruding therefrom. The first guide frame 35 has a guide groove 35b penetrating therethrough. The operating pin 38c of the link arm 38 protrudes toward the first guide frame 35 along the axis O1 direction and extends beyond the guide frame 35 through the guide groove 35b of the first guide frame 35. The guide groove 35b has an arc shape with respect to the rotational shaft 38a of the link arm 38. The operating pin 38c is slidable along the guide groove 35b in accordance with pivoting of the link arm 38.

The slider 32 includes a link-arm operating portion 32c that is capable of contacting the operating pin 38c. The slider 32 is configured such that, when the slider 32 slides frontward, the link-arm operating portion 32c presses the operating pin 38c frontward.

Figure 10A:
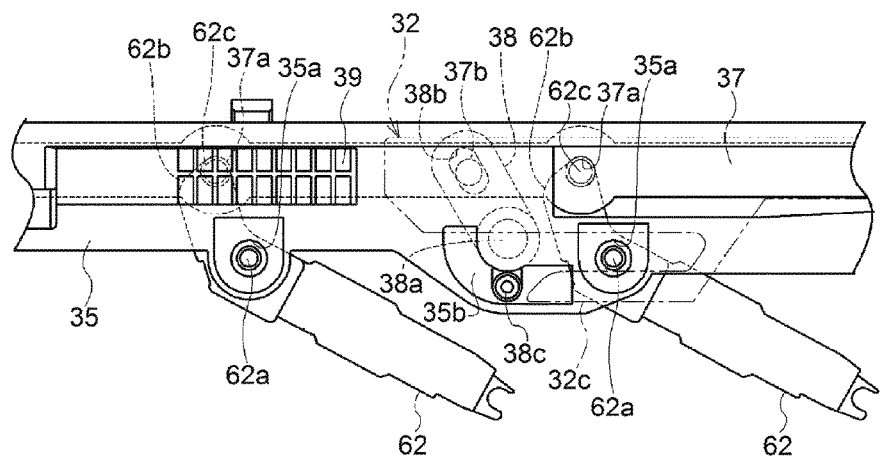
FIG. 10A is a side view of an LED array swinging mechanism in the illustrative embodiment according to one or more aspects of the disclosure, wherein LED arrays are located at respective receded positions.

In the state where the joint cover 3 is located at the open position and the slider 32 is located at the rearmost position, the link-arm operating portion 32c is located behind and spaced from the operating pin 38c. As illustrated in FIG. 10A, in this state, the LED array operating plate 37 is located at a frontward position by the urging force of the tension spring 37c.

The pins 62c of the LED arrays 62 are engaged with the respective engagement holes 37a of the LED array operating plate 37. Therefore, as the LED array operating plate 37 moves frontward, each of the LED arrays 62 swings in a direction in which its pin 62c moves frontward, and thus each of the LED arrays 62 is located at the receded position where the second end of each of the LED arrays 62 is located close to the joint cover 3.

The engagement hole 38b of the link arm 38 is in engagement with the pin 37b of the LED array operating plate 37. Therefore, in response to the frontward movement of the LED array operating plate 37, the link arm 38 pivots in a direction in which the engagement hole 38b moves frontward. Thus, the operating pin 38c is located at a rear position within its movable range.

As the slider 32 slides frontward in conjunction with pivoting of the joint cover 3 toward the closed position from the open position, the link-arm operating portion 32c moves closer to the operating pin 38c to contact thereto. As the joint cover 3 further pivots toward the closed position after the link-arm operating portion 32c contacts the operating pin 38c, the link-arm operating portion 32c presses the operating pin 38c to move the operating pin 38c frontward.

As the operating pin 38c moves frontward, the link arm 38 pivots in a direction in which the engagement hole 38b moves rearward. Since the engagement hole 38b and the pin 37b of the LED array operating plate 37 are engaged with each other, the LED array operating plate 37 moves rearward in conjunction with the rearward movement of the engagement hole 38b.

Figure 10B:
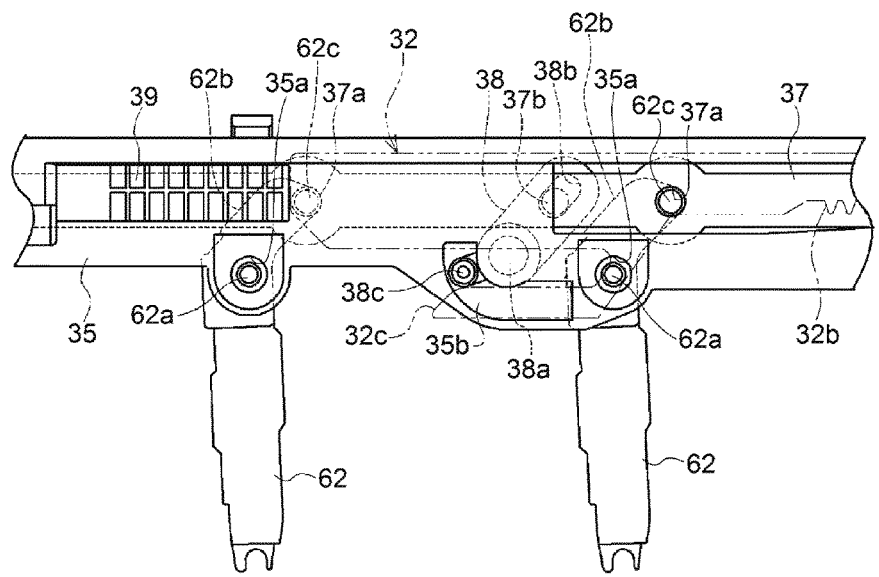
FIG. 10B is a side view of the LED array swinging mechanism in the illustrative embodiment according to one or more aspects of the disclosure, wherein the LED arrays are located at respective exposing positions.

The pins 62c of the LED arrays 62 are engaged with the respective engagement holes 37a of the LED array operating plate 37. Therefore, as illustrated in FIG. 10B, as the LED array operating plate 37 moves rearward, each of the LED arrays 62 swings in a direction in which its pin 62c moves rearward, and thus each of the LED arrays 62 is located at the exposing position where the second end of each of the LED arrays 62 is located distant from the joint cover 3.

In the state where each of the LED arrays 62 is located at the exposing position, when the joint cover 3 pivots from the closed position toward the open position, the slider 32 slides rearward. In response to this, the link-arm operating portion 32c disengages from the operating pin 38c and thus the LED array operating plate 37 moves frontward by the urging force of the tension spring 37c. Thus, each of the LED arrays 62 swings in the direction in which its pin 62c moves frontward, and stays at the receded position.

As described above, in the image forming apparatus 1, the link mechanism including the LED array operating plate 37, the link arm 38, and the arms 62b of the LED arrays 62 is operated by the tension spring 37c and the link-arm operating portion 32c of the slider 32. Each of the LED arrays 62 is configured to swing between the exposing position and the receded position through the operation of the link mechanism.

[Braking-Force Transmission Member (Sliding Movement Synchronizer)]

In the image forming apparatus 1, the joint cover 3 includes the slider 32, the arm 72, and the brake member 31 at the first end portion thereof in the right-left direction, and further includes the slider 33 and the arm 73 at the second end portion thereof in the right-left direction. A braking force generated by the brake member 31 disposed at the first end portion of the joint cover 3 is transmitted to the slider 33 disposed at the second end portion of the joint cover 3 in the right-left direction via the braking-force transmitting member 34.

The slider 33 includes a support 33a and a rack gear 33b. The support 33a supports the second end 73b of the arm 73. The rack gear 32b extends toward the rear from the support 33a along the sliding direction of the slider 33. The rack gear 33b is an example of a second rack.

The braking-force transmitting member 34 includes a first gear 34a, a second gear 34b, and a transmission shaft 34c. The first gear 34a is in mesh with the rack gear 32b of the slider 32. The second gear 34b is in mesh with the rack gear 33b of the slider 33. The transmission shaft 34c connects between the first gear 34a and the second gear 34b and transmits torque therebetween.

The first gear 34a and the second gear 34b are supported and covered by a first cover 34d and a second cover 34e, respectively, attached to the joint cover 3. The first gear 34a and the second gear 34b include support portions for supporting the first gear 34a and the second gear 34b, respectively. The support portions may be bearing members. The bearing members support the transmission shaft 34c that may be a rotational shaft of the first gear 34a and the second gear 34b.

In one example, the first gear 34a and the second gear 34b may be directly connected to or in mesh with the rack gears 32b and 33b, respectively. In another example, the first gear 34a and the second gear 34b may be indirectly connected to the rack gears 32b and 33b, respectively, via another gear.

As described above, in the image forming apparatus 1, the braking-force transmitting member 34 is disposed at the joint cover 3 and the slider 32 and the slider 33 are connected to each other via the braking-force transmitting member 34. With this configuration, even in the case where the brake member 31 is disposed at only one of the end portions of the joint cover 3 in the right-left direction, twisting or warping of the joint cover 3 that may be caused when the joint cover 3 pivots may be reduced by transmission of a braking force generated by the brake member 31 to the sliders 32 and 33.

The sliders 32 and 33 are connected to each other via the braking-force transmitting member 34. This configuration may enable the sliders 32 and 33 to slide in synchronization with each other.

That is, the first gear 34a and the second gear 34b of the braking-force transmitting member 34 are configured to rotate together by the transmission shaft 34c, and the slider 32 and the slider 33 are in mesh with the first gear 34a and the second gear 34b, respectively. Therefore, a braking force generated by the brake member 31 is transmitted to the slider 33 via the slider 32 and thus the slider 33 slides in synchronization with the slider 32.

As described above, the braking-force transmitting member 34 functions as a sliding movement synchronizer that is configured to synchronize sliding movement of the slider 33 with sliding movement of the slider 32. The transmission shaft 34c of the braking-force transmitting member 34 functions as a synchronization shaft that connects between the first gear 34a and the second gear 34b to rotate the gears 34a and 34b together for synchronizing sliding movement of the slider 33 with sliding movement of the slider 32.

The braking-force transmitting member 34 synchronizes sliding movement of the slider 33 with sliding movement of the slider 32. This may enable transmission of a braking force to the slider 33 for which no brake member is provided, and the braking force may be applied to the right and left portions of the joint cover 3 equally. Therefore, this may reduce or prevent twisting or warping of the joint cover 3 that may be caused when the joint cover 3 pivots.

In other embodiments, for example, the joint cover 3 may include the brake member 31 at each of the opposite end portions thereof in the right-left direction. In this case, also, the braking-force transmitting member 34 may function as the sliding movement synchronizer that synchronizes the sliding movement of the slider 33 with the sliding movement of the slider 32 to apply the braking force equally to both the right and left end portions of joint cover 3.

Figure 11:
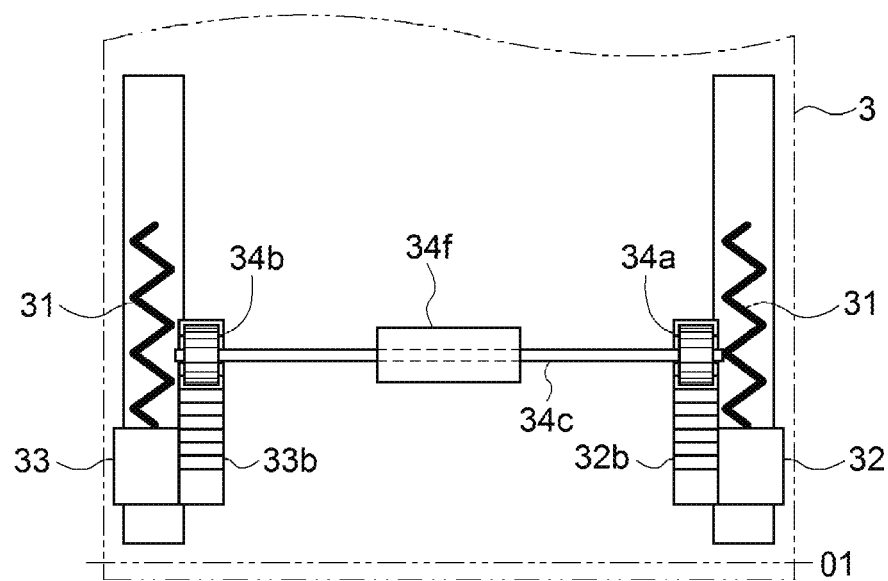
FIG. 11 is a bottom view illustrating a joint cover including brake members at first and second end portions thereof, respectively, in an axis O1 direction and supporting a middle portion of a transmission shaft using a bearing in an alternative embodiment according to one or more aspects of the disclosure.

For example, in an alternative embodiment, as illustrated in FIG. 11, the joint cover 3 includes a brake member 31 at the first end portion thereof in the axial O1 direction and a further brake member 31 at the second end portion thereof in the axial O1 direction. In this case, however, a braking force generated by the first brake member may differ from a braking force generated by the further brake member. Even if such a situation occurs, the braking-force transmitting member 34 may transmit an excess force from one of the brake members that generates a sufficient braking force to the other of the brake members that generates an insufficient braking force. Consequently, in the alternative embodiment, the braking forces may also equally act on the right and left portions of the joint cover 3.

In the alternative embodiment, for example, the braking-force transmitting member 34 may further include a bearing 34f that may be fixed to the joint cover 3 and support a middle portion of the transmission shaft 34c in the axial O1 direction. The first gear 34a and the second gear 34b may be supported by the bearing 34f. In this case, the cover members for covering the first gear 34a and the second gear 34b might not be needed. This configuration may enable the braking-force transmitting member 34 to have a relatively small size, which may result in reducing or preventing interference of the braking-force transmitting member 34 to another member or component.

The configuration in which the bearing 34f supports the middle portion of the transmission shaft 34c may be applied to the illustrative embodiment in which the joint cover 3 includes the brake member 31 at the first end portion thereof only in the axial O1 direction.

Effects Obtained by Illustrative Embodiments

The image forming apparatus 1 includes the lower casing 2, the joint cover 3, the slider 32, the arm 72, and the brake member 31. The lower casing 2 includes the photosensitive unit 6. The joint cover 3 has a rear end (the one end) that is supported so as to be pivotable on the axis O1 relative to the lower casing 2. The joint cover 3 is configured to pivot on the axis O1 between the closed position and the open position. At the closed position, the joint cover 3 covers at the upper portion of the lower casing 2. At the open position, the joint cover 3 exposes the upper portion of the lower casing 2. The joint cover 3 includes the LED arrays 62 that may be the exposure unit. The slider 32 is disposed at the joint cover 3 and is configured to slide in the sliding direction orthogonal to the axis O1. The arm 72 includes the first end 72a supported so as to be pivotable relative to the lower casing 2. The arm 72 further includes the second end 72b supported so as to be pivotable relative to the slider 32. The brake member 31 is configured to, when the slider 32 slides in the sliding direction in accordance with pivoting of the joint cover 3, control (e.g., reduce) the speed of the slider 32.

As described above, the brake member 31 is configured to control the sliding movement of the slider 32 supporting the second end 72b (disposed closer to the joint cover 3 than the first end 72a) of the arm 72 positioned between the lower casing 2 and the joint cover 3. With this configuration, therefore, pivoting of the joint cover 3 may be controlled (e.g., the pivoting speed of the joint cover 3 may be reduced) by a larger force as compared with the conventional manner in which a middle portion of an arm is urged in the direction in which the joint cover 3 opens.

Consequently, when the heavy joint cover 3 including the LED arrays 62 is being closed, a sufficient braking force may be applied to the joint cover 3 to prevent or reduce a sudden closing of the joint cover 3, thereby reducing or preventing damage to the LED array 62.

The brake member 31 is configured to generate a braking force proportionally to the pivoting speed of the joint cover 3.

Therefore, in a case where the pivoting speed of the joint cover 3 increases during closing of the joint cover 3, the brake member 31 is able to generate a braking force in response to the closing speed of the joint cover 3. Thus, if the joint cover 3 tends to fling close, the closing speed of the joint cover 3 may be reduced, thereby preventing or reducing damage to the LED arrays 62.

The slider 32 includes the rack gear 32b. The brake member 31 includes the rotary damper 31a, and the gear unit 31b. The rotary damper 31a includes the damper portion that is configured to generate a braking force proportional to the rotating speed of the brake gear 312. The gear unit 31b is configured to transmit sliding movement of the slider 32 to the rotary damper 31a by transforming the sliding movement of the slider 32 into gear rotation. The gear unit 31b is further configured to transmit the braking force generated by the rotary damper 31a to the rack gear 32b.

With this configuration, the braking force generated by the rotary damper 31a may be reliably transmitted to the rack gear 32b to reduce the closing speed of the joint cover 3. This may thus reduce or prevent damage to the LED arrays 62 that may be caused by an impact of the joint cover 3 colliding with the lower casing 2 at the instant when the joint cover 3 is completely closed.

The gear unit 31b includes the braking-force transmission switching member that is configured to, only when the joint cover 3 pivots in the direction in which the joint cover 3 closes, transmit the braking force to the rack gear 32b. In one example, the braking-force transmission switching member may be the swing gear 313. The swing gear 313 is included in the gear train extending from the rack gear 32b to the brake gear 312. The swing gear 313 is configured to, when the joint cover 3 pivots in the direction in which the joint cover 3 closes, mesh with the brake gear 312 adjacent thereto. The swing gear 313 is further configured to, when the joint cover 3 pivots in the direction in which the joint cover 3 opens, disengages from the brake gear 312.

In another example, the braking-force transmission switching member may be the one-way clutch 319. The one-way clutch 319 is included in the gear train extending from the rack gear 32b to the brake gear 312. The one-way clutch 319 is configured to, when the joint cover 3 pivots in the direction in which the joint cover 3 closes, establish transmission of the braking force from the rotary damper 31a to the rack gear 32b. The one-way clutch 319 is further configured to, when the joint cover 3 pivots in the direction in which the joint cover 3 opens, interrupt transmission of the braking force from the rotary damper 31a to the rack gear 32b.

As described above, providing the braking-force transmission switching member, e.g., the swing gear 313 or the one-way clutch 319, in the gear unit 31b may enable reduction of the pivoting speed of the joint cover 3 when the joint cover 3 is being closed. In addition, this may reduce resistance to pivoting of the joint cover 3 when the joint cover 3 is being opened. Thus, the user can open the joint cover 3 with relatively small force.

The joint cover 3 further includes the spring 39. The spring 39 is configured to, when the joint cover 3 is at or near the closed position, apply, to the slider 32, an urging force that acts in a direction opposite to the direction in which the slider 32 slides when the joint cover 3 pivots in the closing direction.

With this configuration, when the joint cover 3 proving in the closing direction reaches the vicinity of the closed position, the closing speed of the joint cover 3 may be controlled (e.g., reduced) by the urging force of the spring 39 in addition to the braking force generated by the brake member 31. Therefore, the closing speed of the joint cover 3 may be further reliably reduced, thereby preventing or reducing damage to the LED arrays 62.

Further, with this configuration, the urging force of the spring 39 may assist the opening of the joint cover 3 when the joint cover 3 pivots from the closed position toward the open position. Thus, this configuration may also reduce resistance to pivoting of the joint cover 3 when the joint cover 3 is being opened.

Each of the LED arrays 62 (e.g., the exposure unit) has the first end and the second end that are opposite to each other in the direction orthogonal to the array direction of the LED elements. In each of the LED arrays 62, the first end is supported so as to be pivotable relative to the joint cover 3, and the second end is movable between the exposing position and the retracted position. At the exposing position, the second end is located distant from the joint cover 3. At the retracted position, the second end is located near the joint cover 3.

With this configuration, the link mechanism is driven by the sliding movement of the slider 32 to swing each of the LED arrays 62 between the exposing position and the retracted position. Therefore, this configuration might not require a special arm that may drive the link mechanism for swinging the LED arrays 62, and space may be thus saved.

A load applied to the slider 32 when the slider 32 drives the link mechanism may act as a braking force for reducing the sliding speed of the slider 32. Therefore, this load may supplement the braking force generated by the brake member 31.

When the joint cover 3 is opened completely, the exposure unit is located at the receded position. Therefore, larger space for maintenance, e.g., replacement of one or more photosensitive drums 61a placed in the lower casing 2, may be ensured as compared with a case where each of the LED arrays 62 is not located at the receded position when the joint cover 3 is opened completely.

The pivot P1 of the first end 72a (e.g., a supported portion supported by the lower frame 2) of the arm 72 is located lower than the axis O1 that functions as the pivot of the joint cover 3 in the top-bottom direction.

Therefore, this configuration may enable application of a braking force for controlling (e.g., reducing) the pivoting speed of the joint cover 3 in the closing direction also when the joint cover 3 is located at the closed position.

The sliders 32 and 33 are disposed at the first and second end portions, respectively, of the joint cover 3 in the axis O1 direction. The arms 72 and 73 are disposed at the first and second end portions, respectively, of the joint cover 3 in the axis O1 direction. The brake member 31 is disposed at the first end portion of the joint cover in the axis O1 direction. The joint cover 3 includes the braking-force transmitting member 34 configured to transmit a braking force generated by the brake member 31 to the slider 33 disposed at the second end portion of the joint cover 3 in the axis O1 direction.

That is, the image forming apparatus 1 includes the lower casing 2, the joint cover 3, the slider 32 (e.g., the first slider), the arm 72 (e.g., the first arm), the slider 33 (e.g., the second slider), the arm 73 (e.g., the second arm), the brake member 31, and the braking-force transmitting member 34. The lower casing 2 includes the photosensitive unit 6. The joint cover 3 has the one end that is supported so as to be pivotable on the axis O1 relative to the lower casing 2. The joint cover 3 is configured to pivot on the axis O1 between the closed position and the open position. At the closed position, the joint cover 3 covers at the upper portion of the lower casing 2. At the open position, the joint cover 3 exposes the upper portion of the lower casing 2. The joint cover 3 includes the LED arrays 62 for exposing the LED arrays 62. The slider 32 is disposed at the first end portion of the joint cover 3 in the axis O1 direction and is configured to slide in the sliding direction orthogonal to the axis O1. The arm 72 is disposed at the first end portion of the image forming apparatus 1 in the axis O1 direction. The arm 72 includes the first end 72a supported so as to be pivotable relative to the lower casing 2. The arm 72 further includes the second end 72b supported so as to be pivotable relative to the slider 32. The slider 33 is disposed at the second end portion of the joint cover 3 in the axis O1 direction and is configured to slide in the sliding direction orthogonal to the axis O1. The arm 73 is disposed at the second end portion of the image forming apparatus 1 in the axis O1 direction. The arm 73 includes the first end 73a supported so as to be pivotable relative to the lower casing 2. The arm 73 further includes the second end 73b supported so as to be pivotable relative to the slider 33. The brake member 31 is disposed at the first end portion of the joint cover 3 in the axis O1 direction and is configured to, when the slider 32 slides in the sliding direction in accordance with pivoting of the joint cover 3, control (e.g., reduce) the speed of the slider 32. The braking-force transmitting member 34 is disposed at the joint cover 3. The braking-force transmitting member 34 is configured to transmit the braking force generated by the brake member 31 to the slider 33 to control (e.g., reduce) the sliding speed of the slider 33 in the sliding direction in accordance with pivoting of the joint cover 3.

This configuration may increase the force for controlling the speed of the joint cover 3 pivoting in the closing direction. Therefore, the closing speed of the joint cover 3 may be further reliably reduced, thereby preventing or reducing damage to the LED arrays 62. Therefore, even in a case where a brake member 31 that generates a relatively small braking force is used, the pivoting speed of the joint cover 3 may be controlled (e.g., reduced) sufficiently. Consequently, the brake member 31 may have a relatively small size.

Further, the joint cover 3 may be supported by both of the arms 72 and 73 disposed at the first and second end portions, respectively, of the image forming apparatus 1 in the axis O1 direction. Therefore, even when the joint cover 3 has a relatively low stiffness, such a configuration may reduce or prevent the joint cover from being twisted or warped.

The braking-force transmitting member 34 includes the first gear 34a, the second gear 34b, and the transmission shaft 34c. The first gear 34a is in mesh with the rack gear 32b of the slider 32 disposed at the first end portion of the joint cover 3 in the axis O1 direction. The second gear 34b is in mesh with the rack gear 33b of the slider 33 disposed at the second end portion of the joint cover 3 in the axis O1 direction. The transmission shaft 34c connects between the first gear 34a and the second gear 34b and transmits torque therebetween.

Therefore, the braking force generated by the brake member 31 for the slider 32 may be transmitted to the slider 33 with such a simple configuration. The closing speed of the joint cover 3 is controlled at both of the first and second end portions thereof in the axis O1 direction. Therefore, in this case, as compared with a case where the closing speed of the joint cover 3 is controlled at one of the first and second end portions thereof in the axis O1 direction, a force that tends to twist the joint cover 3 may be less generated and twisting or warping of the joint cover 3 may be reduced or prevented when the joint cover 3 pivots.

The image forming apparatus 1 includes the lower casing 2, the joint cover 3, the slider 32, the arm 72, the slider 33, the arm 73, the brake member 31, and the braking-force transmitting member 34. The rear end portion (e.g., the one of the end portions) of the joint cover 3 is supported so as to be pivotable on the axis O1 relative to the lower casing 2. The joint cover 3 is configured to pivot on the axis O1 between the closed position where the joint cover 3 covers the upper portion of the lower casing 2 and the open position where the joint cover 3 exposes the upper portion of the lower casing 2. The slider 32 is disposed at the first end portion of the joint cover 3 in the axis O1 direction and is configured to slide in the sliding direction orthogonal to the axis O1 direction. The arm 72 is disposed the first end portion of the image forming apparatus 1 in the axis O1 direction. The first end portion of the arm 72 is supported so as to be pivotable relative to the lower casing 2. The second end portion of the arm 72 is supported so as to be pivotable relative to the slider 32. The slider 33 is disposed at the second end portion of the joint cover 3 in the axis O1 direction and is configured to slide in the sliding direction. The arm 73 is disposed at the second end portion of the image forming apparatus 1 in the axis O1 direction. The first end portion of the arm 73 is supported so as to be pivotable relative to the lower casing 2. The second end portion of the arm 73 is supported so as to be pivotable relative to the slider 33. The brake member 31 is disposed at the first end portion of the joint cover in the axis O1 direction. The brake member 31 is configured to, when the slider 32 slides in the sliding direction in accordance with pivoting of the joint cover 3, control the speed of the slider 32. The braking-force transmitting member 34 is disposed at the joint cover 3 and is configured to synchronize sliding movement of the slider 33 with sliding movement of the slider 32.

As described above, the braking-force transmitting member 34 functions as the sliding movement synchronizer that is configured to synchronize sliding movement of the slider 33 with sliding movement of the slider 32. Therefore, the tilting angles of the right and left portions of the joint cover 3 are the same degree when the joint cover 3 is being closed, which may result in reducing or preventing the joint cover 3 from being twisted or warped. In particular, in a case where the joint cover 3 includes the brake member 31 at the first end portion thereof only in the axial O1 direction to control (e.g., reduce) the sliding speed of the slider 32 only, the braking-force transmitting member 34 may transmit the braking force to the slider 33 for which no brake member is provided. Therefore, the braking force may be applied to both the right and left portions of the joint cover 3 equally, which may result in reducing or preventing the joint cover 3 from being twisted or warped.

The slider 32 (e.g., the first slider) includes the rack gear 32b (e.g., the first rack). The slider 33 (e.g., the second slider) includes the rack gear 33b (e.g., the second rack). The braking-force transmitting member 34 includes the first gear 34a meshing with the rack gear 32b, the second gear meshing with the rack gear 33b, and the synchronization shaft 34c connecting between the first gear 34a and the second gear 34b to rotate the first and second gears together.

Therefore, such a simple configuration may enable synchronization of sliding movement of the slider 33 with sliding movement of the slider 32, which may result in reducing or preventing the joint cover 3 from being twisted or warped.

The braking-force transmitting member 34 includes the bearing 34f fixed to the joint cover 3 and that supports the synchronization shaft 34c such that synchronization shaft 34c is rotatable.

This configuration may enable attachment of the braking-force transmitting member 34 to the joint cover 3 using the bearing 34f. That is, the braking-force transmitting member 34 may be attached to the joint cover 3 by the simple compact structure. Therefore, this configuration may reduce or prevent interference of the braking-force transmitting member 34 to another member or component.

The image forming apparatus 1 further includes another brake member 31 at the second end portion of the joint cover 3 in the axis O1 direction. The another brake member 31 is configured to control the speed of the slider 33 sliding in the sliding direction in accordance with pivoting of the joint cover 3.

In a case where the joint cover 3 includes the brake member 31 on each of the first and second end portions thereof in the axial O1 direction, a braking force generated by one of the brake members 31 may differ from a braking force generated by the other of the brake member 31. Even if such a situation occurs, the braking-force transmitting member 34 may transmit an excess force from one of the brake members 31 that may generate a sufficient braking force to the other of the brake members 31 that may generate an insufficient braking force. Consequently, the braking forces may be applied equally to the right and left end portions of the joint cover 3, which may result in reducing or preventing the joint cover 3 from being twisted or warped.

The image forming unit is an electrophotographic image forming unit. The image forming unit includes the photosensitive drum 61a (e.g., the photosensitive body), and the exposure unit including the LED array 62. The exposure unit is configured to expose the photosensitive drum 61a. The photosensitive body is placed in the lower casing 2. The exposure unit includes the first end supported so as to be pivotable relative to the joint cover 3. The exposure unit further includes the second end that is configured to move between the exposing position where the second end is located distant from the upper casing and the receded position where the second end is located close to the joint cover 3. The joint cover 3 further includes the link mechanism configured to swing the exposure unit between the exposing position and the receded position in accordance with sliding movement of the first slider relative to the joint cover 3.

With this configuration, the exposure unit may swing between the exposing position and the retracted position by driving of the link mechanism in accordance with sliding movement of the slider 32. Therefore, this configuration might not require a special arm that may drive the link mechanism for swinging the exposure unit, and space may be thus saved.

A load applied to the slider 32 when the slider 32 drives the link mechanism may act as a braking force for reducing the sliding speed of the slider 32. Therefore, this load may supplement the braking force generated by the brake member 31.

When the joint cover 3 is opened completely, the exposure unit is located at the receded position. Therefore, larger space for maintenance, e.g., replacement of one or more photosensitive drums 61a placed in the lower casing 2, may be ensured as compared with a case where the exposure unit is not located at the receded position when the joint cover 3 is opened completely.

What is claimed is:

1. An image forming apparatus comprising:
   a lower casing including a photosensitive body;
   an upper casing configured to pivot on a predetermined axis relative to the lower casing between a closed position where the upper casing covers an upper portion of the lower casing and an open position where the upper casing exposes the upper portion of the lower casing, the upper casing including an exposure unit configured to expose the photosensitive body;
   a slider attached to the upper casing and configured to slide in a sliding direction orthogonal to the predetermined axis;
   an arm including a first end pivotably connected to the lower casing and a second end pivotably connected to the slider; and
   a brake member that controls a speed of the slider when the slider slides in the sliding direction,
   wherein the slider includes a rack, and
   wherein the brake member includes:
      a rotary damper, including a damper gear, to generate a braking force proportional to a rotating speed of the damper gear; and
      a gear unit connected to the rack and configured to transform sliding movement of the slider into gear rotation to transmit to the rotary damper and to transmit the braking force generated by the rotary damper to the rack, the gear unit including a swing gear included in a gear train, wherein the swing gear is configured to transmit the braking force to the rack only when the upper casing pivots from the open position to the closed position.

2. The image forming apparatus according to claim 1, wherein the brake member is configured to generate a braking force proportional to a pivoting speed of the upper casing.

3. The image forming apparatus according to claim 1, wherein the gear train extends from the rack to the damper gear, and the swing gear is configured to mesh with a gear adjacent to the swing gear when the upper casing pivots from the open position to the closed position and to disengage from the adjacent gear when the upper casing pivots from the closed position to the open position.

4. The image forming apparatus according to claim 1, wherein the upper casing includes a spring configured to apply an urging force, which acts in a direction opposite to the direction in which the slider slides when the upper casing pivots from the open position to the closed position, to the slider when the upper casing is located at or near the closed position.

5. The image forming apparatus according to claim 1,
wherein the exposure unit is an LED array having a first end, which is supported swingably relative to the upper casing, and a second end, which is pivotable between an exposing position where the second end is away from the upper casing and a retracted position where the second end is close to the upper casing, and
wherein the upper casing includes a link mechanism configured to pivot the exposure unit between the exposing position and the retracted position in accordance with sliding movement of the slider relative to the upper casing.

6. The image forming apparatus according to claim 1, wherein the arm has a supported portion supported by the lower casing, and the supported portion is located lower than the predetermined axis.

7. The image forming apparatus according to claim 1, wherein the rotary damper includes a damper portion comprising viscous fluid including silicon oil.

8. An image forming apparatus comprising:
a lower casing including a photosensitive body;
an upper casing configured to pivot on a predetermined axis relative to the lower casing between a closed position where the upper casing covers an upper portion of the lower casing and an open position where the upper casing exposes the upper portion of the lower casing, the upper casing including an exposure unit configured to expose the photosensitive body;
a slider attached to the upper casing and configured to slide in a sliding direction orthogonal to the predetermined axis;
an arm including a first end pivotably connected to the lower casing and a second end pivotably connected to the slider; and
a brake member that controls a speed of the slider when the slider slides in the sliding direction,
wherein the upper casing further includes a further slider configured to slide in the sliding direction orthogonal to the predetermined axis, and the image forming apparatus further includes a further arm including a first end pivotably connected to the lower casing and a second end pivotably connected to the further slider,
wherein the slider is disposed at a first end portion and the further slider is disposed at a second end portion opposite to the first end portion, of the upper casing, in a direction in which the predetermined axis extends,
wherein the arm is disposed at the first end portion and the further arm is disposed at the second end portion, of the upper casing, in the direction in which the predetermined axis extends,
wherein the brake member is disposed at the first end portion of the upper casing in the direction in which the predetermined axis extends, and
wherein the upper casing includes a braking-force transmitting member configured to transmit a braking force generated by the brake member to the slider disposed at the second end portion of the upper casing in the direction in which the predetermined axis extends.

9. The image forming apparatus according to claim 8,
wherein the slider includes a rack, and
wherein the brake member includes:
a rotary damper, including a damper gear, to generate a braking force proportional to a rotating speed of the damper gear; and
a gear unit connected to the rack and configured to transform sliding movement of the slider into gear rotation to transmit to the rotary damper and to transmit the braking force generated by the rotary damper to the rack.

10. The image forming apparatus according to claim 9, wherein the gear unit includes a braking-force transmission switching member configured to transmit the braking force to the rack only when the upper casing pivots from the open position to the closed position.

11. The image forming apparatus according to claim 8, wherein the brake member is configured to generate a braking force proportional to a pivoting speed of the upper casing.

12. The image forming apparatus according to claim 10, wherein the braking-force transmission switching member includes a swing gear, which is included in a gear train extending from the rack to the damper gear, and is configured to mesh with a gear adjacent to the swing gear when the upper casing pivots from the open position to the closed position and to disengage from the adjacent gear when the upper casing pivots from the closed position to the open position.

13. The image forming apparatus according to claim 10, wherein the braking-force transmission switching member includes a one-way clutch, which is included in a gear train extending from the rack to the damper gear, and is configured to establish transmission of the braking force from the damper gear to the rack when the upper casing pivots from the open position to the closed position and to interrupt transmission of the braking force from the damper gear to the rack when the upper casing pivots from the closed position to the open position.

14. The image forming apparatus according to claim 8, wherein the upper casing includes a spring configured to apply an urging force, which acts in a direction opposite to the direction in which the slider slides when the upper casing pivots from the open position to the closed position, to the slider when the upper casing is located at or near the closed position.

15. The image forming apparatus according to claim 8,
wherein the exposure unit is an LED array having a first end, which is supported swingably relative to the upper casing, and a second end, which is pivotable between an exposing position where the second end is away from the upper casing and a retracted position where the second end is close to the upper casing, and
wherein the upper casing includes a link mechanism configured to pivot the exposure unit between the exposing position and the retracted position in accordance with sliding movement of the slider relative to the upper casing.

16. The image forming apparatus according to claim 8, wherein the arm has a supported portion supported by the lower casing, and the supported portion is located lower than the predetermined axis.

17. The image forming apparatus according to claim 9, wherein the rotary damper includes a damper portion comprising viscous fluid including silicon oil.

18. An image forming apparatus comprising:
a lower casing including a photosensitive body;
an upper casing configured to pivot on a predetermined axis relative to the lower casing between a closed position where the upper casing covers an upper portion of the lower casing and an open position where the upper casing exposes the upper portion of the lower casing, the upper casing including an exposure unit configured to expose the photosensitive body;

a first slider attached to a first end portion of the upper casing in a direction in which the predetermined axis extends and configured to slide in a sliding direction orthogonal to the predetermined axis;

a first arm disposed at a first end portion of the image forming apparatus in the direction in which the predetermined axis extends and including a first end pivotably connected to the lower casing and a second end pivotably connected to the first slider;

a second slider attached to a second end portion of the upper casing in the direction in which the predetermined axis extends and configured to slide in the sliding direction;

a second arm disposed at a second end portion of the image forming apparatus in the direction in which the predetermined axis extends and including a first end pivotably connected to the lower casing and a second end pivotably connected to the second slider;

a brake member disposed at the first end portion of the upper casing in the direction in which the predetermined axis extends and configured to control a speed of the first slider when the first slider slides in the sliding direction; and a braking-force transmitting member configured to transmit a braking force generated by the brake member to the second slider to control a speed of the second slider sliding in the sliding direction.

19. The image forming apparatus according to claim 18, wherein the braking-force transmitting member includes:

a first gear meshing with a first rack of the first slider disposed at the first end portion of the upper casing in the direction in which the predetermined axis extends;

a second gear meshing with a second rack of the second slider disposed at the second end portion of the upper casing in the direction in which the predetermined axis extends; and a transmission shaft connected between the first gear and the second gear and configured to transmit torque therebetween.

20. The image forming apparatus according to claim 19, wherein the braking-force transmitting member includes a bearing fixed to the upper casing and configured to rotatably support the transmission shaft.

21. The image forming apparatus according to claim 18, wherein the casing includes a further brake member disposed at the second end portion of the upper casing in the direction in which the predetermined axis extends and configured to control a speed of the second slider when the second slider slides in the sliding direction.

22. An image forming apparatus comprising:

a lower casing including a photosensitive body;

an upper casing configured to pivot on a predetermined axis relative to the lower casing between a closed position where the upper casing covers an upper portion of the lower casing and an open position where the upper casing exposes the upper portion of the lower casing, the upper casing including an exposure unit configured to expose the photosensitive body;

a slider attached to the upper casing and configured to slide in a sliding direction orthogonal to the predetermined axis;

an arm including a first end pivotably connected to the lower casing and a second end pivotably connected to the slider; and a brake member that controls a speed of the slider when the slider slides in the sliding direction, wherein the slider includes a rack, and wherein the brake member includes:

a rotary damper, including a damper gear, to generate a braking force proportional to a rotating speed of the damper gear; and a gear unit connected to the rack and configured to transform sliding movement of the slider into gear rotation to transmit to the rotary damper and to transmit the braking force generated by the rotary damper to the rack, the gear unit including a one-way clutch, which is configured to transmit the braking force to the rack only when the upper casing pivots from the open position to the closed position, wherein the one-way clutch is included in a gear train extending from the rack to the damper gear, and is configured to establish transmission of the braking force from the damper gear to the rack when the upper casing pivots from the open position to the closed position and to interrupt transmission of the braking force from the damper gear to the rack when the upper casing pivots from the closed position to the open position.

* * * * *